United States Patent [19]

Oda et al.

[11] Patent Number: 5,635,251

[45] Date of Patent: Jun. 3, 1997

[54] WET-ON-WET COATING METHOD

[75] Inventors: Hiroaki Oda, Hiratsuka; Yasumasa Okumura, Yokohama; Hiroshi Inoue; Hisashi Isaka, both of Hiratsuka, all of Japan

[73] Assignee: Kansai Paint Company, Limited, Amagasaki, Japan

[21] Appl. No.: 442,702

[22] Filed: May 17, 1995

[30] Foreign Application Priority Data

May 20, 1994 [JP] Japan .................... 6-130929

[51] Int. Cl.$^6$ .................. B05D 1/36; B05D 3/02; B05D 7/26
[52] U.S. Cl. .................. 427/407.1; 427/409
[58] Field of Search .................. 427/407.1, 409

[56] References Cited

U.S. PATENT DOCUMENTS

| | | | |
|---|---|---|---|
| 4,530,958 | 7/1985 | Kasari et al. | 524/512 |
| 4,761,212 | 8/1988 | Watanabe et al. | 427/410 |
| 4,812,335 | 3/1989 | Kuwajii | 427/407.1 |
| 5,064,695 | 11/1991 | Hotta et al. | 427/407.1 |
| 5,210,154 | 5/1993 | Weidemeier et al. | 525/438 |
| 5,324,788 | 6/1994 | Kuo | 525/329.5 |
| 5,397,603 | 3/1995 | Okude et al. | 427/410 |

FOREIGN PATENT DOCUMENTS

| | | |
|---|---|---|
| 2247632 | 3/1992 | United Kingdom . |
| 2249496 | 5/1992 | United Kingdom . |
| WO94/27741 | 12/1994 | WIPO . |

OTHER PUBLICATIONS

UK Search Report; Application No: GB 9510213.3; Dated: Jul. 26, 1995.

*Primary Examiner*—Diana Dudash
*Attorney, Agent, or Firm*—Armstrong, Westerman, Hattori, McLeland & Naughton

[57] ABSTRACT

The present invention provides a wet-on-wet coating method comprising applying a thermosetting aqueous coating composition (A), and applying a thermosetting aqueous coating composition (B) to the uncured coating surface of the aqueous coating composition (A) wherein the aqueous coating composition (A) contains a base resin with a neutralization value of 20 to 30 KOH mg/g and the aqueous coating composition (B) contains a base resin with a neutralization value higher by 10 to 20 KOH mg/g than the base resin of the aqueous coating composition (A).

5 Claims, No Drawings

WET-ON-WET COATING METHOD

The present invention relates to a novel wet-on-wet coating method of applying a plurality of aqueous coating compositions, the method being capable of providing a multi-layer coating film which is excellent in appearance and surface smoothness.

It is common practice to coat a substrate with a plurality of thermosetting aqueous coating compositions by a wet-on-wet method. For example, in coating an automotive body, a thermosetting aqueous intermediate coating composition (a) is sprayed to cationically electrophoretically coated exterior panels for doors, hood, roof, trunk lid, fenders and the like, and a thermosetting aqueous intermediate coating composition (b) for forming a coating film with substantially the same color as the topcoating for exterior panels is applied to interior panels for doors, hood, roof, trunk lid, fenders and the like. Subsequently the two intermediate coatings are simultaneously heated for curing, and the exterior panels are coated with a topcoating composition. In the above coating process, unavoidably the intermediate coating composition (a) is deposited on an interior panel area close to the exterior panel, and the intermediate coating composition (b) is deposited on an exterior panel area close to the interior panel. Consequently the thus applied intermediate coating compositions (a) and (b) lie overlapping each other in a wet-on-wet state at the boundary between the exterior and interior panels.

Further, for coating the center pillar of an automotive body, a thermosetting aqueous intermediate coating composition is applied after cationic electrodeposition and a thermosetting aqueous black topcoating composition is applied only to the center pillar prior to curing of the composition.

When a plurality of thermosetting aqueous coating compositions are applied by a conventional wet-on-wet method, the compositions may be deposited as locally mixed or inverted with the result that the multi-layer coating film suffers from the drawbacks of impaired appearance, deteriorated surface smoothness and surface roughening. Further, generally such drawbacks can scarcely be eliminated by applying a topcoating composition to the coating.

An object of the present invention is to provide a novel wet-on-wet coating method of applying a plurality of thermosetting aqueous coating compositions without entailing the above problems.

Another object of the invention is to provide a novel wet-on-wet coating method of applying a plurality of thermosetting aqueous coating compositions, the method being capable of forming a coating film excellent in appearance and surface smoothness and free from deposition as locally mixed or inverted.

These and other objects of the present invention will become apparent from the following description.

The present invention provides a wet-on-wet coating method comprising applying a thermosetting aqueous coating composition (A), and applying a thermosetting aqueous coating composition (B) to the uncured coating surface of the aqueous coating composition (A) wherein the aqueous coating composition (A) contains a base resin with a neutralization value of 10 to 40 KOH mg/g and the aqueous coating composition (B) contains a base resin with a neutralization value higher by 10 to 20 KOH mg/g than the base resin of the aqueous coating composition (A).

The present inventors conducted extensive research to solve the above problems of the prior art and found that the problems can be solved and the objects can be achieved by adjusting the base resins of thermosetting aqueous coating compositions to be applied by a wet-on-wet method to a neutralization value within a specific range. The present invention has been accomplished based on this novel finding.

The thermosetting aqueous coating composition (A) is applied to the surface of the substrate prior to application of the thermosetting aqueous coating composition (B). According to the present invention, it is essential that the base resin of the aqueous coating composition (A) have a neutralization value within the range of 10 to 40 KOH mg/g, preferably 20 to 30 KOH mg/g. If the neutralization value is lower than 10 KOH mg/g, the base resin has a reduced water dispersion stability and the coatings of the aqueous coating compositions (A) and (B) tend to be deposited as locally mixed or inverted. On the other hand, the neutralization value greater than 40 KOH mg/g results in reduction in coating amenability of the composition, water resistance of the coating film and the like. Thus, a neutralization value outside the above-specified range is undesirable.

The term "neutralization value" of the base resin used herein means the amount (calculated as KOH mg) of neutralized carboxyl groups per gram of the base resin. The carboxyl groups of the base resin are partly or wholly neutralized. If the carboxyl groups of the base resin are all neutralized, the neutralization value of the base resin equals the acid value thereof. If the carboxyl groups of the base resin are partly neutralized, the neutralization value is lower than the acid value thereof.

The aqueous coating composition (A) may be a known coating composition which has the above-specified neutralization value. Thus, the aqueous coating composition (A) comprises an aqueous solution or dispersion of a base resin and a crosslinking agent and optional components such as coloring pigments, metallic pigments, extender pigments, additives, organic solvents and the like.

The base resin is the main component for forming a coating film of the aqueous coating composition (A). Useful resins include those having a crosslinkable functional group and a carboxyl group in the molecule. The carboxyl group is neutralized to make an aqueous base resin. The crosslinkable functional group includes, for example, a hydroxyl group, epoxy group, isocyanate group, amino group and the like. The resin may have one kind of groups or at least two kinds of groups. It is preferred that at least two functional groups be bonded to a molecule of the base resin. The carboxyl group and crosslinkable functional group may be introduced by a known method.

Preferred base resins are, for example, acrylic resins, polyester resins, alkyd resins, urethane resins, epoxy resins, modified resins thereof and the like which have a carboxyl group and a crosslinkable functional group. They can be used singly or at least two of them can be used in combination. The number average molecular weight of these resins is preferably about 1,000 to 100,000, more preferably about 2,000 to 30,000. An aqueous emulsion of a three-dimensionally crosslinked particulate polymer having a carboxyl group and a crosslinkable functional group is also usable as the base resin.

The amount of carboxyl groups of the base resin of the aqueous coating composition (A) is, before neutralization, preferably 10 to 50 KOH mg/g, more preferably 20 to 30 KOH mg/g, based on the acid value. The carboxyl groups of the resin are partly or wholly neutralized to adjust the neutralization value of the resin to the above-specified range, giving a base resin for use in the aqueous coating composition (A).

The neutralizing agent which is used for neutralizing the carboxyl groups includes, for example, ammonia; primary monoamines such as ethylamine, propylamine, butylamine, benzylamine, monoethanolamine, neopentanolamine, 2-aminopropanol, 3-aminopropanol and the like; secondary monoamines such as diethylamine, diethanolamine, di-n-propanolamine, di-iso-propanolamine, N-methylethanolamine, N-ethylethanolamine and the like; tertiary monoamines such as dimethylethanolamine, trimethylamine, triethylamine, triisopropylamine, methyldiethanolamine, dimethylaminoethanol and the like; amino compounds such as diethylenetriamine, hydroxyethylaminoethylamine, ethylaminoethylamine, methylaminopropylamine and the like; alkali metal hydroxides such as sodium hydroxide, potassium hydroxide, lithium hydroxide and the like; alkaline earth metal hydroxides such as calcium hydroxide, barium hydroxide and the like; etc.

The crosslinking agent is used for three-dimensionally crosslinking the base resin, and can be, for example, at least one member selected from amino resins, polyisocyanate compounds and the like. The amino resins include, for example, a methylolated amino resin obtained by the reaction between formaldehyde and an amino component such as melamine, urea, benzoguanamine or the like; resins obtained by etherifying all or part of the methylol groups of the resin with a monohydric alcohol having 1 to 5 carbon atoms; and the like. Useful polyisocyanate compounds are, for example, aliphatic, alicyclic and aromatic polyisocyanate compounds having at least two isocyanate groups in a molecule. Also usable are blocked polyisocyanate compounds prepared by reacting the polyisocyanate compounds with a blocking agent.

The proportions of the base resin and crosslinking agent in the aqueous coating composition (A) are not limited specifically. However, the base resin is used in a proportion of 50 to 90 wt. %, preferably 60 to 80 wt. %, and the crosslinking agent is used in a proportion of 50 to 10 wt. %, preferably 40 to 20 wt. %, based on the total amount of the two components.

The aqueous coating composition (A) can be directly applied to a metallic or plastic substrate such as an automotive body. In this case, it is preferred that the substrate be appropriately coated with a primer or the like such as a cationic electrophoretic coating composition, when necessary.

Preferably, the aqueous coating composition (A) is adjusted to a viscosity of 20 to 200 seconds, preferably 30 to 100 seconds, as measured by Ford cup No. 4 at 20° C., and then applied to a thickness of 10 to 60 μm (when cured) by spraying, electrostatic deposition or like method.

The aqueous coating composition (B) is applied to the uncured coating surface of the aqueous coating composition (A). According to the present invention, it is critical that the base resin of the aqueous coating composition (B) have a neutralization value higher by 10 to 20 KOH mg/g than the base resin of the aqueous coating composition (A). If the difference in the neutralization value between the base resins of the aqueous coating compositions (A) and (B) is less than 10 KOH mg/g, the two coatings tend to be deposited as locally mixed or inverted. On the other hand, a difference higher than 20 KOH mg/g reduces the coating amenability of the composition, water resistance of the resulting coating film and the like. Thus, a neutralization value difference outside the above range is undesirable.

The aqueous coating composition (B) for use in the present invention can be a known coating composition which has the above-specified neutralization value. The aqueous coating composition (B) comprises an aqueous solution or dispersion of a base resin and a crosslinking agent and optional components such as coloring pigments, extender pigments, additives, organic solvents and the like.

The base resin is the main component for forming a coating film of the aqueous coating composition (B). Useful base resins are, for example, those having a crosslinkable functional group and a carboxyl group in the molecule. The crosslinkable functional group includes, for example, a hydroxyl group, epoxy group, isocyanate group, amino group and the like. The resin may have one kind of the groups or at least two kinds of the groups. It is preferred that at least two functional groups be bonded to a molecule of the base resin. The carboxyl group and crosslinkable functional group may be introduced by a known method.

Preferred base resins are, for example, acrylic resins, polyester resins, alkyd resins, urethane resins, epoxy resins, modified resins of these resins and the like which have a carboxyl group and a crosslinkable functional group. They can be used singly or at least two of them can be used in combination. The number average molecular weight of these resins is preferably about 1,000 to 100,000, more preferably about 2,000 to 30,000. An aqueous emulsion of a three-dimensionally crosslinked particulate polymer having a carboxyl group and a crosslinkable functional group is also usable as the base resin.

The amount of carboxyl groups in the base resin of the aqueous coating composition (B) is, before neutralization, preferably 20 to 60 KOH mg/g, more preferably 30 to 50 KOH mg/g, based on the acid value. The carboxyl groups of the resin are partly or wholly neutralized to adjust the neutralization value of the base resin to the above-specified range, giving a base resin for use in the aqueous coating composition (B). The same neutralizing agents exemplified for the aqueous coating composition (A) can be used.

The crosslinking agent is used for three-dimensionally crosslinking the base resin, and can be, for example, at least one member selected from amino resins, polyisocyanate compounds and the like. Specific examples of these resins and compounds are the same as those exemplified for the aqueous coating composition (A).

The proportions of the base resin and crosslinking agent in the aqueous coating composition (B) are not limited specifically. However, the base resin is used in a proportion of 50 to 90 wt. %, preferably 60 to 80 wt. %, and the crosslinking agent is used in a proportion of 50 to 10 wt. %, preferably 40 to 20 wt. %, based on the total amount of the two components.

The aqueous coating composition (B) is applied to the uncured coating surface of the aqueous coating composition (A). It is preferred, for example, that a substrate be coated with the aqueous coating composition (A), and the coating is allowed to stand at room temperature for several minutes, and then coated with the aqueous coating composition (B).

Preferably the aqueous coating composition (B) is adjusted to a viscosity of 20 to 200 seconds, preferably 30 to 100 seconds, as measured by Ford cup No. 4 at 20° C., and then applied to a thickness of 10 to 60 μm (when cured) by spraying, electrostatic deposition or like method.

Thus, the method of the present invention comprises applying the aqueous coating composition (A), and without curing the coating, applying the aqueous coating composition (B) to the coating surface by a wet-on-wet method.

Specific examples of such methods are given below.

(1) A method is provided which comprises applying aqueous intermediate coating compositions (a) and (b) to cationically electrophoretically coated exterior and interior panels of an automotive body, respectively, wherein the aqueous coating composition (A) is used as the aqueous intermediate coating compositions (a) and the aqueous coating composition (B) as the aqueous intermediate coating composition (b). Stated more specifically the aqueous coating composition (A) is sprayed to exterior panels and the aqueous coating composition (B) for forming a coating film with substantially the same color as the topcoating for exterior panels is applied to interior panels prior to curing of the composition (A), followed by heating the coatings for curing. In this coating process, the aqueous coating composition (B) remains superposed in a wet-on-wet manner on the coating composition (A) sparsely dusted on the interior panels as well as at the boundary between the exterior and interior panels. Some particles of coating composition (B) may lie scattered on the uncured coating of the composition (A).

(2) A method is provided which comprises applying the aqueous intermediate coating composition (a) to the whole surface of cationically electrophoretically coated exterior panels of an automotive body, applying an aqueous black topcoating composition only to the center pillar of exterior panel prior to curing of composition (a) wherein the aqueous coating composition (A) is used as the aqueous composition (a) and the aqueous coating composition (B) is used as the aqueous black topcoating composition.

(3) A method is provided which comprises applying an aqueous metallic or coloring coating composition and an aqueous clear coating composition by a two-coat one-bake method wherein the aqueous coating compositions (A) and (B) are used as the aqueous metallic or coloring coating composition and the aqueous clear coating composition, respectively.

In the present invention, the aqueous coating compositions (A) and (B) can be applied by optional methods in accordance with the intended purpose. Preferred methods include, for example, air spraying, airless spraying, electrostatic deposition, dipping, electrodeposition and the like. The film thickness can be suitably selected but is preferably about 10 to 60 μm, more preferably about 20 to 40 μm, when cured. Preferably, the aqueous coating composition (A) thus applied is allowed to stand around room temperature for about 1 to 10 minutes for drying without crosslinking. Then, the aqueous coating composition (B) is applied and the two coatings are heated at about 110° to 160° C. for about 20 to 60 minutes to accomplish simultaneous curing on crosslinking. Popping can be effectively inhibited by pre-drying the coatings at about 40° to 70° C. for about 1 to 30 minutes before heating for curing.

The method of the present invention can produce the following remarkable results.

(1) Since the base resins of the aqueous coating compositions (A) and (B) have neutralization values in the above-specified range, the two compositions, although applied by a wet-on-wet method, are laid superposed without mixed or inverted deposition, resulting in prevention of detracting from the appearance of coating and surface smoothness and in freedom from surface roughening.

(2) When an aqueous base coating composition and aqueous clear coating composition are applied by a conventional wet-on-wet coating method, a prolonged period of time is taken to evaporate the water and the like from the aqueous base coating. When the aqueous coating compositions (A) and (B) are used as the aqueous base coating composition and aqueous clear coating composition, respectively, the process can be simplified since the aqueous coating composition (B) can be immediately applied to the wet coating surface of the aqueous coating composition (A).

EXAMPLES

Preparation Examples, Examples and Comparative Examples are presented below to illustrate the present invention in further detail.

Preparation Example 1

Preparation of thermosetting aqueous coating composition (A-1)

One thousand parts (by weight as solid, the same applies hereinafter) of polyester resin, 40 parts of dimethylaminoethanol, 300 parts of an imino-containing methyl-etherified melamine resin (product of MITSUI CYTEC LTD., trade name "CYMEL 703"), 1,500 parts of titanium white pigment (product of SAKAI CHEMICAL INDUSTRY CO., LTD., trade name "R-41") and 4.5 parts of carbon black (product of Mitsubishi Chemical Corp., trade name "Mitsubishi Carbon Black M-100") were dispersed by stirring in 1,720 parts of deionized water to prepare a thermosetting aqueous coating composition (A-1).

The above polyester resin was prepared as follows. A reactor was charged with 0.75 mole of neopentyl glycol, 0.25 mole of trimethylol propane, 0.4 mole of adipic acid and 0.5 mole of phthalic anhydride. The components were subjected to reaction at 220° C. for 5 hours. After adding 0.035 mole of trimellitic anhydride, the reaction was performed at 160° C. for 1 hour. The thus obtained polyester resin had a number average molecular weight of about 6,000, an acid value of 25 KOH mg/g and a hydroxyl value of 110 KOH mg/g. One equivalent of carboxyl groups in the polyester resin was neutralized with dimethylaminoethanol serving as a neutralizing agent to a neutralization value of 25 KOH mg/g.

Preparation Example 2

Preparation of thermosetting aqueous coating composition (B-1)

One thousand parts of polyester resin, 56 parts of dimethylaminoethanol, 300 parts of an imino-containing methyl-etherified melamine resin (product of MITSUI CYTEC LTD., trade name "CYMEL 703"), 540 parts of barium sulfate and 60 parts of carbon black (product of Mitsubishi Chemical Corp., trade name "Mitsubishi Carbon Black M-100") were dispersed by stirring in 1,720 parts of deionized water to prepare a thermosetting aqueous coating composition (B-1).

The above polyester resin was prepared as follows. A reactor was charged with 0.87 mole of neopentyl glycol, 0.13 mole of trimethylol propane, 0.45 mole of adipic acid and 0.5 mole of phthalic anhydride. The components were subjected to reaction at 220° C. for 5 hours. After adding 0.05 mole of trimellitic anhydride, the reaction was performed at 160° C. for 1 hour. The thus obtained polyester resin had a number average molecular weight of about 8,000, an acid value of 35 KOH mg/g and a hydroxyl value of 52 KOH mg/g. One equivalent of carboxyl groups in the polyester resin was neutralized with dimethylaminoethanol to a neutralization value of 35 KOH mg/g.

Preparation Example 3

Preparation of thermosetting aqueous coating composition (B-2)

A thermosetting aqueous coating composition (B-2) was prepared in the same manner as in Preparation Example 2 with the exception that the amount of trimellitic anhydride was changed to 0.06 mole, and that a polyester resin was prepared which had an acid value of 40 KOH mg/g and a hydroxyl value of 50 KOH mg/g, and the polyester resin was adjusted to a neutralization value of 40 KOH mg/g by neutralizing one equivalent of carboxyl groups with dimethylaminoethanol.

Preparation Example 4

Preparation of thermosetting aqueous coating composition (B-3)

A thermosetting coating composition (B-3) was prepared in the same manner as in Preparation Example 2 with the exception of using the polyester resin of Preparation Example 1 in lieu of the polyester resin of Preparation Example 2 and using dimethylaminoethanol in an amount of 40 parts.

Preparation Example 5

Preparation of thermosetting aqueous coating composition (B-4)

A thermosetting aqueous coating composition (B-4) was prepared in the same manner as in Preparation Example 2 with the exception that the amount of trimellitic anhydride was changed to 0.04 mole and that a polyester resin was prepared which had an acid value of 30 KOH mg/g and a hydroxyl value of 55 KOH mg/g and the polyester resin was adjusted to a neutralization value of 30 KOH mg/g by neutralizing one equivalent of carboxyl groups with diethylaminoethanol.

Preparation Example 6

Preparation of thermosetting aqueous coating composition (B-5)

A thermosetting aqueous coating composition (B-5) was prepared in the same manner as in Preparation Example 2 with the exception that the amount of trimellitic anhydride was changed to 0.12 mole and that a polyester resin was prepared which had an acid value of 50 KOH mg/g and a hydroxyl value of 47 KOH mg/g and the polyester resin was adjusted to a neutralization value of 50 KOH mg/g by neutralizing one equivalent of carboxyl groups with diethylaminoethanol.

Preparation Example 7

Preparation of thermosetting aqueous coating composition (B-6)

A thermosetting aqueous coating composition (B-6) was prepared in the same manner as in Preparation Example 3 with the exception that the polyester resin used in Preparation Example 3 (an acid value of 40 KOH mg/g and a hydroxyl value of 50 KOH mg/g) was adjusted to a neutralization value of 25 KOH mg/g by neutralizing 0.625 equivalent of carboxyl groups with diethylaminoethanol.

Preparation Example 8

Preparation of thermosetting aqueous coating composition (B-7)

A thermosetting aqueous coating composition (B-7) was prepared in the same manner as in Preparation Example 3 with the exception that the polyester resin used in Preparation Example 3 (an acid value of 40 KOH mg/g and a hydroxyl value of 50 mg/g) was adjusted to a neutralization value of 15 KOH mg/g by neutralizing 0.375 equivalent of carboxyl groups with diethylaminoethanol.

Examples 1 and 2 and Comparative Examples 1 to 5

A dull-finished steel panel (with a surface treated with zinc phosphate) was coated with an epoxy resin-based cationic electrophoretic coating composition (trade name "ELECRON #9800", product of KANSAI PAINT CO., LTD.). The coating had a thickness of 25 µm (when cured, the same applies hereinafter). After heating the coating for curing, the thermosetting aqueous coating composition (A) prepared above was applied by spraying to the whole surface of the coating to a thickness of 30 to 35 µm, and the resulting coating was allowed to stand for 3 minutes at room temperature. Subsequently, the thermosetting aqueous coating composition (B) prepared above was applied by spraying to give a coating having a thickness of 0 to 20 µm with a progressively thinned periphery. The two coatings were allowed to stand for 7 minutes at room temperature and pre-dried at 60° C. for 10 minutes. The coatings were simultaneously heated at 140° C. for 30 minutes for curing.

For application, the aqueous coating compositions (A) and (B) were adjusted to a viscosity 50 seconds as measured by Ford cup No. 4 at 20° C.

The surface of the coating film was visually evaluated in respect of gloss and surface smoothness. The evaluation was performed on the three portions (horizontal portion, slanting portion and dust portion) of the coating film.

The horizontal portion refers to a main film area wherein the thermosetting aqueous coating composition (B) is deposited to a thickness of 20 µm on the coating of the thermosetting aqueous coating composition (A). The slanting portion refers to a peripheral film area wherein the thermosetting aqueous coating composition (B) is deposited on the coating of the thermosetting aqueous coating composition (A) to form a progressively thinned layer with a thickness varied from 0 to 20 µm. The dust portion refers to a film area wherein the thermosetting aqueous coating composition (B) is deposited as sparsely dusted on the coating of the thermosetting aqueous coating composition (A). The surface of these portions was rated according to the following criteria.

A: The entire surface of the portion was satisfactory in gloss and surface smoothness.

B: The surface or the portion was partly unsatisfactory in gloss and surface smoothness.

C: The surface of the portion was markedly poor in gloss and surface smoothness.

Further, a coating amenability test was conducted as follows. The aqueous coating compositions (A) and (B) were applied in the same manner as above.

The coated substrate was left, prior to curing, to stand upright for 7 minutes and pre-dried at 60° C. for 10 minutes, followed by baking at 140° C. for 30 minutes. The coating film was evaluated according to the following criteria.

A: A coating surface had no sagging or popping when the aqueous coating composition (B) was applied to a thickness of 20 to 50 µm (when cured) on the wet coating surface of the aqueous coating composition (A) (a thickness of 30 µm when cured).

B: A coating surface had sagging or popping when the aqueous coating composition (B) was applied to a thickness of at least 20 µm (when cured) on the wet coating surface of the aqueous coating composition (A) (a thickness of 30 µm when cured).

C: A coating surface had sagging or popping when the aqueous coating composition (B) was applied to a thickness of less than 20 µm (when cured) on the wet coating surface of the aqueous coating composition (A) (a thickness of 30 µm when cured).

Table 1 shows the tested aqueous coating compositions, the surface condition, and the coating amenability of the compositions.

TABLE 1

|  | Example | | Comp. Ex. | | | | |
| --- | --- | --- | --- | --- | --- | --- | --- |
|  | 1 | 2 | 1 | 2 | 3 | 4 | 5 |
| Aqueous coating composition | | | | | | | |
| Aqueous coating composition (A) | (A-1) | (A-1) | (A-1) | (A-1) | (A-1) | (A-1) | (A-1) |
| Neutralization value of base resin (KOH mg/g) | 25 | 25 | 25 | 25 | 25 | 25 | 25 |
| Aqueous coating composition (B) | (B-1) | (B-2) | (B-3) | (B-4) | (B-5) | (B-6) | (B-7) |
| Neutralization value of base resin (KOH mg/g) | 35 | 40 | 25 | 30 | 50 | 25 | 15 |
| Evaluation result | | | | | | | |
| Surface condition | | | | | | | |
| Horizontal portion | A | A | C | A | A | C | C |
| Slanting portion | A | A | B | B | A | B | C |
| Dust portion | A | A | A | A | A | A | B |
| Coating amenability | | | | | | | |
| Sagging | A | A | A | A | C | A | A |
| Popping | A | A | A | A | A | A | A |

We claim:

1. A wet-on-wet coating method comprising applying a thermosetting aqueous coating composition (A) to a substrate, and applying a thermosetting aqueous coating composition (B) to the uncured coating surface of the aqueous coating composition (A) wherein the aqueous coating composition (A) contains a base resin with a neutralization value of 20 to 30 KOH mg/g and the aqueous coating composition (B) contains a base resin with a neutralization value higher by 10 to 20 KOH mg/g than the base resin of the aqueous coating composition (A).

2. A coating method according to claim 1 wherein the aqueous coating composition (A) comprises a base resin having a carboxyl group and a crosslinkable functional group, and a crosslinking agent.

3. A coating method according to claim 1 wherein the base resin of the aqueous coating composition (A) has an acid value of 10 to 50 KOH mg/g.

4. A coating method according to claim 1 wherein the aqueous coating composition (B) comprises a base resin having a carboxyl group and a crosslinkable functional group, and a crosslinking agent.

5. A coating method according to claim 1 wherein the base resin of the aqueous coating composition (B) has an acid value of 20 to 60 KOH mg/g.

* * * * *